(12) United States Patent
Langer (10) Patent No.: US 12,030,631 B2
(45) Date of Patent: Jul. 9, 2024

(54) AIRCRAFT WITH REMOVABLE POD AND WING FOR TRANSPORTING CARGO ON PALLETS

(71) Applicant: Sandor Mark Langer, Redwood City, CA (US)

(72) Inventor: Sandor Mark Langer, Redwood City, CA (US)

(73) Assignee: Sandor Mark Langer, Sunnyvale, CA (US)

( * ) Notice: Subject to any disclaimer, the term of this patent is extended or adjusted under 35 U.S.C. 154(b) by 84 days.

(21) Appl. No.: 17/732,938

(22) Filed: Apr. 29, 2022

(65) Prior Publication Data

US 2023/0348056 A1 Nov. 2, 2023

Related U.S. Application Data

(60) Provisional application No. 63/285,069, filed on Dec. 1, 2021.

(51) Int. Cl.
| | |
|---|---|
| *B64C 9/02* | (2006.01) |
| *B60L 50/60* | (2019.01) |
| *B64C 1/14* | (2006.01) |
| *B64C 25/36* | (2006.01) |
| *B64C 25/52* | (2006.01) |
| *B64C 29/00* | (2006.01) |
| *B64C 37/02* | (2006.01) |

(Continued)

(52) U.S. Cl.
CPC ............ *B64C 39/024* (2013.01); *B60L 50/66* (2019.02); *B64C 1/1415* (2013.01); *B64C 9/02* (2013.01); *B64C 25/36* (2013.01); *B64C 25/52* (2013.01); *B64C 37/02* (2013.01); *B64D 9/003* (2013.01); *B64D 27/24* (2013.01); *B64D 27/40* (2024.01); *B60L 2200/10* (2013.01); *B64C 29/0008* (2013.01); *B64U 30/20* (2023.01); *B64U 50/19* (2023.01); *B64U 2101/60* (2023.01)

(58) Field of Classification Search
CPC ...... B64U 20/40; B64U 30/291; B64U 60/30; B64C 29/008; B64C 29/0016; B64C 29/0025; B64C 29/0033
See application file for complete search history.

(56) References Cited

U.S. PATENT DOCUMENTS

| | | | | |
|---|---|---|---|---|
| 8,336,811 B2 * | 12/2012 | Cazals | ............... | B64C 39/02 |
| | | | | 244/46 |
| 2014/0097290 A1 * | 4/2014 | Leng | ............... | B60L 50/52 |
| | | | | 244/6 |

(Continued)

*Primary Examiner* — Timothy D Collins
*Assistant Examiner* — Justin Michael Heston
(74) *Attorney, Agent, or Firm* — University of San Francisco School of Law; Brienne Johnson; Aaron Posner (57) ABSTRACT

An unmanned aerial vehicle (UAV) has a wing assembly that is coupled to a cargo carrying pod. The pod has a pallet storage volume and an aerodynamic outer surface. The wing assembly has wings that are coupled to rotor booms that include motors and rotors. A tail assembly is coupled to tail booms that extend back from the wings. Rudders are coupled to the rear portions of the tail booms and an elevator is coupled to top portions of the rudders. The elevator is at least 84 inches high and the rudders are at least 48 apart so that a forklift can drive under the elevator and between the rudders to a rear door of the pod to place cargo on a pallet into the storage area of the pod.

14 Claims, 7 Drawing Sheets

(51) Int. Cl.
  *B64C 39/02*    (2023.01)
  *B64D 9/00*     (2006.01)
  *B64D 27/24*    (2006.01)
  *B64D 27/40*    (2024.01)
  *B64U 30/20*    (2023.01)
  *B64U 50/19*    (2023.01)
  *B64U 101/60*   (2023.01)

(56) References Cited

U.S. PATENT DOCUMENTS

2018/0105267 A1* 4/2018 Tighe .................. B64C 29/0025
2022/0227490 A1* 7/2022 Tian ................... B64C 29/0025
2023/0150659 A1* 5/2023 Ivans .................... B64U 50/19
                                                    244/12.4

* cited by examiner

AIRCRAFT WITH REMOVABLE POD AND WING FOR TRANSPORTING CARGO ON PALLETS

CROSS REFERENCE TO RELATED APPLICATIONS

This patent application claims priority to U.S. Provisional Patent Application No. 63/285,069, "Unmanned Aerial Vehicle Having A Modular Construction" filed Dec. 1, 2021, which is hereby incorporated by reference in its entirety.

BACKGROUND

Unmanned aerial vehicles (UAVs), that are designed for freight or cargo transportation, typically use non-standard form factors for carrying cargo. This non-standard form factor limits the use of their system to particular niches of the cargo market that use those sizes of cargo. The majority of all cargo and freight transported in the world is transported via pallet. However, current drones are not configured to accept cargo that is on a pallet.

Vertical Takeoff and Landing (VTOL) is a type of UAV. The advantage of a VTOL aircraft is that they do not have the infrastructure required of a traditional aircraft. As such, the vehicle must use a power source that also works with the existing infrastructure of the new operating environment. Most warehouses have the electrical infrastructure to charge a UAV but many generally do not include fueling infrastructure for gasoline or hydrogen vehicles. Most of the current VTOLs have either an electric or hybrid internal combustion-electric propulsion. The problems for electric or hybrid internal combustion-electric VTOLs is that they require either long recharge times on the ground to continue operation for full-electric designs or require low available fuel for hybrid designs in remote places, like oil platforms. Moreover, when utilizing existing VTOLs in remote areas, such as oil rigs, the equipment typically requires the use of non-standard form factors adding time and labor to the loading and unloading process.

What is needed is a VTOL UAV that can easily load and unload cargo stored on pallets that can utilize standard form factors for carrying cargo.

SUMMARY OF THE INVENTION

The present invention is directed towards a VTOL UAV that has cargo carrying pod that can be releasably coupled to a wing assembly having a wing with motors coupled to rotors and a tail assembly coupled to a rear portion of the wing. The motors and rotors can be attached to rotor booms that are attached across the cord of the wings. The tail assembly can be attached to the rear edge of the wing by two tail booms. The tail assembly can include two rudders and an elevator coupled to the top portions of the rudders. The tail configuration can allow a cargo carrying mechanism, such as a fork lift or a pallet truck, to move to and from the pod between the rudders and under the elevator.

The pod can have an aerodynamic outer shape that can have a rounded front portion and a tapered rear portion. The pod shape can be teardrop shaped to provide lower aero dynamic drag as the UAV travels horizontally. The pod can also have an internal cargo storage volume that can be configured to carry cargo placed on a pallet. The floor of the internal cargo storage volume can be a horizontal planar surface that can be at least 40 inches in width by at least 48 inches in length by at least 72 inches in height. Rear door(s) at the rear portion of the pod can open with an edge of the door opening adjacent to the storage volume. The rear door(s) can be attached to hinges that allow the rear door(s) to open about a vertical axis so that the door(s) swing horizontally outward.

To use the UAV, the rear door(s) can be opened and the cargo on a pallet can be moved by a fork lift or a pallet truck between the rudders and under the elevator. If a fork lift is used, the pallet can be placed into the storage volume of the pod. The fork lift can lower the pallet onto the floor of the storage volume. The fork lift can back away from the pod and away from the UAV between the rudders and under the elevator. If a pallet truck is used, a ramp can be placed at the door opening. The pallet truck with the pallet and cargo can be moved over the ramp to the door opening. The pallet truck can lower the pallet onto the floor of the storage volume. The pallet truck can be rolled away from the pod down the ramp away and away from the UAV between the rudders and under the elevator. The rear door can be closed and the UAV can fly away from the landing pad.

The rotors can be vertically oriented and configured to provide vertical thrust to allow the UAV to takeoff and land vertically. The UAV can takeoff from an initial landing pad and rise to a sufficiently high altitude to fly horizontally, at which point, some of the rotors can also rotate to provide horizontal thrust so that the UAV can fly horizontally with lift provided by the wing. In the flying configuration, the UAV can travel in a substantially horizontal direction with some or most of the rotors stopped since the wing can produce sufficient vertical lift to support the UAV. When the UAV reaches the desired destination, the horizontally orientated rotors can be rotated back into a vertical orientation and the other vertically oriented rotors can be started. Since the UAV is no longer moving horizontally, the wings may no longer provide lift and the UAV can be fully supported by the vertically oriented rotors. The vertically oriented rotors can then be used to land the UAV on a destination landing pad. The doors of the pod can be opened and the cargo can be unloaded from the pod in the same manner described above to load the cargo into the pod.

In some embodiments, the pod can be separated from the wing assembly and the pod can contain fuel and/or rechargeable batteries. The pod can have a landing gear that has wheels that allow the pod to be rolled away from the wing assembly and the cargo can be removed from the pod and delivered to the end recipient. The depleted pod can be replaced with a fully charged pod that can contain different cargo on a pallet that can be shipped from the destination landing pad to the initial landing pad or a different destination landing pad. This exchange of pods can allow the UAV to perform 24 hour, 7 days per week operation. In other embodiments, the wing assembly can contain batteries or fuel that can allow the wing assembly to return to the initial landing pad without a pod.

The modular design described can efficiently integrate existing transportation infrastructure by transporting cargo and freight by pallet within the pod unit of the UAV. In some embodiments, the modular design can also be used for transporting passengers. In this embodiment, the pod can include windows and a ventilation system. The described vehicle is meant to fix the problems with existing electric cargo UAV designs. Namely, the vehicle aims to allow for quicker ground operation and integrate directly into the existing logistics infrastructure.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural form as well as the singular forms, unless the context clearly indicates otherwise. It will be further understood that the terms "comprises" and/or "comprising," when used in this specification, specify the presence of stated features, steps, operation, elements, and/or components, but do not preclude the presence or addition of one or more other features, steps, operations, elements, components, and/or groups thereof.

Unless otherwise defined, all terms (including technical and scientific terms) used herein have the same meanings as commonly understood by one having skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. The present disclosure is to be considered as an exemplification of the invention and is not intended to limit the invention to the specific embodiments illustrated by the figures or description below.

Figure 1A:
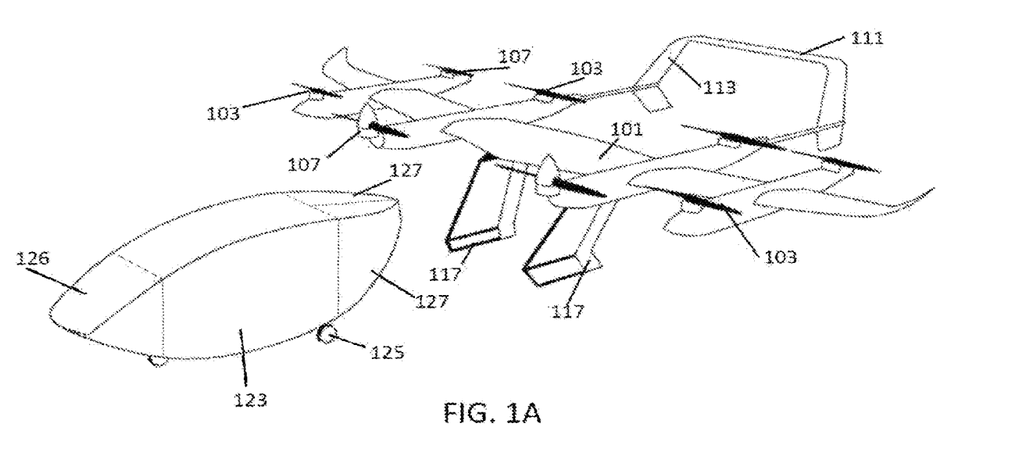
FIG. 1A illustrates a perspective view of the pod separated from the wing assembly.

With reference to FIG. 1A, the inventive subject matter provides apparatus, systems and methods in which an unmanned aerial vehicle (UAV) 100 that can have a pod 123 that can be releasably coupled to a wing assembly 101 with a releasable coupling 161. In the illustrated embodiment, the releasable coupling 161 has been released and the pod 123 is separated from the wing assembly 101. The wing assembly 101 can have two skids 117 that can support the weight of the entire wing assembly 101. The pod 123 can have a landing gear 125 with wheels that allow the pod 123 to be rolled and moved under the wing assembly 101 between the two skids 117. The pod 123 can then be secured to the wing assembly 101 with the releasable coupling 161.

Figure 1B:
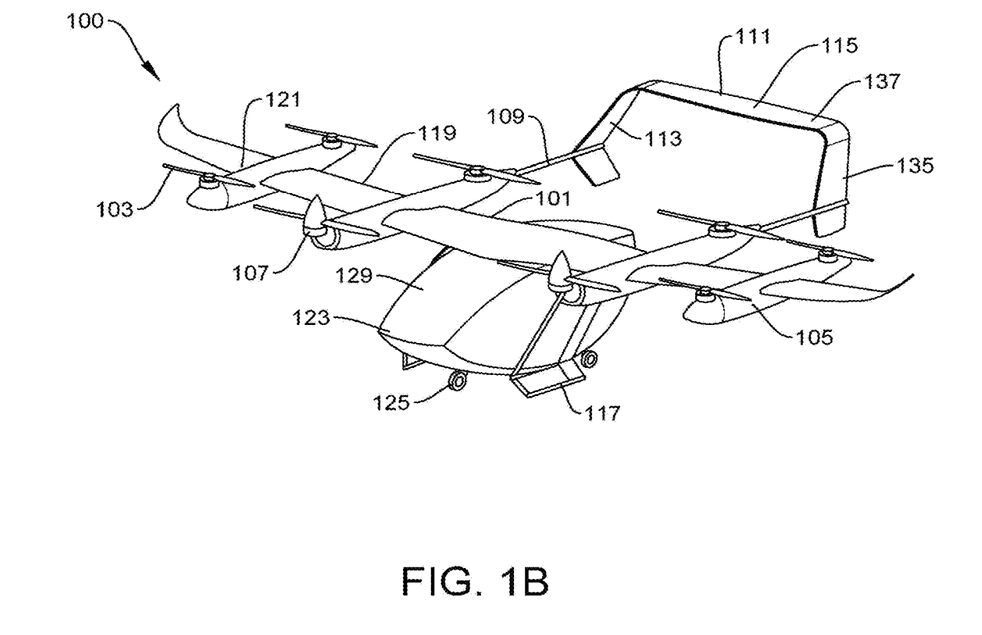
FIG. 1B illustrates a perspective view of the pod coupled to the wing assembly.

With reference to FIG. 1B, the wing assembly 101 extend outwardly from a pod 123 connection mechanism that can releasably secure the wing assembly 101. The pair of wings 101 can have no less than two rotor booms 105 that are coupled across the flap 119 portion of the wings 101. The wing assembly 101 includes a pair of wings and each wing can include an aileron 121 and a flap 119. The UAV 100 can be configured to carry at least 496 pounds (approx. 225 kg).

Figure 1C:
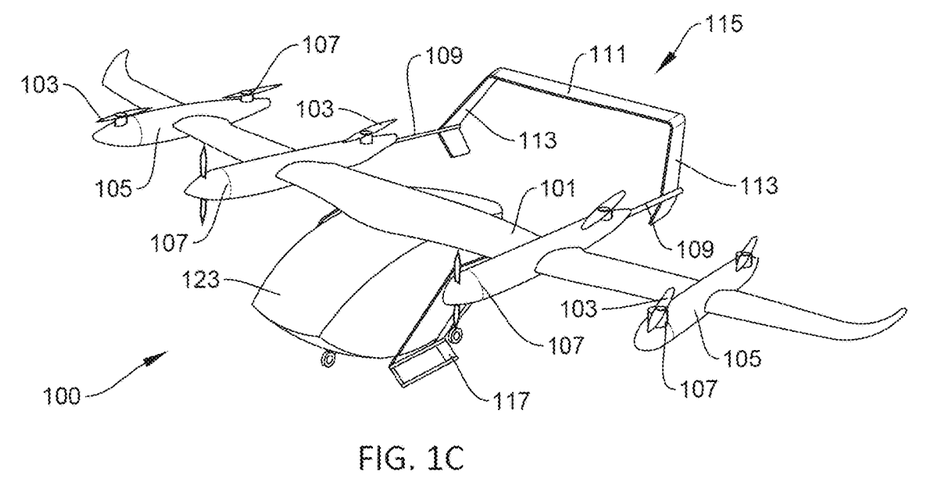
FIG. 1C illustrates a perspective view of the UAV flying with six vertical rotors and two forward tilted rotors.

With reference to FIG. 1C, two of the rotors 103 are preferably tiltable to provide both vertical or horizontal thrust. When all rotors 103 are in a vertical orientation, the rotors 103 provide the UAV 100 with vertical takeoff and landing capability. During flight the UAV 100 can transition into horizontal flight where two of the rotors 103, and their associated motors 107 can be tilted into a horizontal orientation to provide horizontal thrust so that UAV 100 can move forward horizontally and air flow over the wing assembly 101 can provide the lift needed to support the weight of the UAV 100. The remaining motors 107 that are in the vertical orientation can be turned off and the rotors 103 that are vertically oriented can be powered down and stopped to stationary positions with the rotors 103 aligned with the rotor booms 105 to minimize aerodynamic drag while the UAV 100 is flying horizontally.

In some contemplated embodiments, with reference to FIG. 1B, each rotor 103 can be powered by an electric motor 107 and each electric motor 107 can be coupled to the front or rear portion of two or more rotor booms 105. The electric motors 107 can be powered by rechargeable batteries mounted in the rotor booms 105. Two tail booms 109 can extend horizontally backwards from the rear portion of the wing assembly 101. The tail portion 115 of the UAV 100 can be at the rear portion of the tail booms 109. During takeoff and landing, all motors 107 can rotate the rotors 103 in a vertical orientation to provide vertical thrust. In other contemplated embodiments, multiple motors 107 and rotors 103 can transition from a vertical orientation to a horizontal orientation in line with the rotor boom 105, or any angle in-between to provide both vertical and horizontal thrust.

The tail portion 115 of the UAV 100 is located on a center axis that extends back from the wings assembly 101. In some embodiments, the tail 115 is an inverted V-tail with two rudders 113 with no more than two elevator assemblies 111 coupled to the top portions of the rudders 113 that are at least 48" apart. The elevator(s) 111 can have a minimum height of 76" above ground surface when the two skids 117 are in on the ground surface. The two skids 117 can be coupled to, and can extend downward from the lower portion of the wing assembly 101 with the center gravity of the wing assembly 101 that is between the front end and rear end of the two skids 117. The skids 117 support the wing assembly 101 once they are in contact with a ground surface. In other embodiments, the skids 117 may be substituted by landing gear 125 wheels or any other suitable structures.

Figure 3:
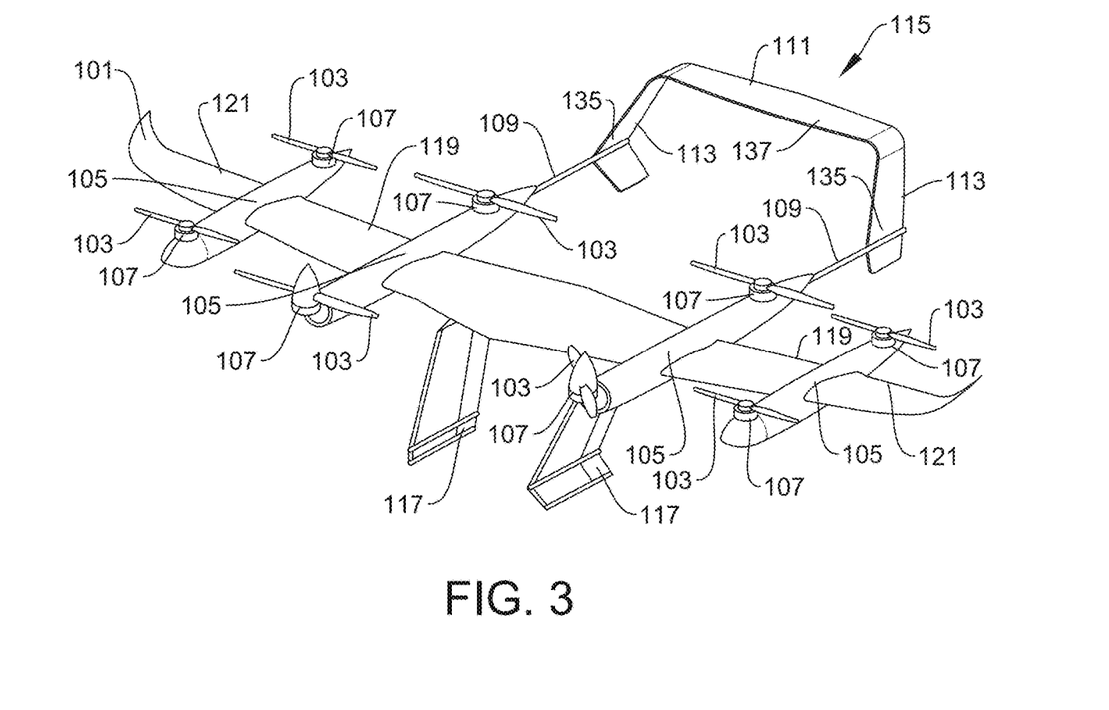
FIG. 3 illustrates a top perspective view of the wing assembly.

In some embodiments, the wing assembly 101 that can be removed or secured to the pod 123 using a releasable connection mechanism. With reference to FIG. 3, the pod has been separated and moved away from the wing 101. The wing assembly 101 can fly alone without a carrier pod. In these embodiments, the wing assembly 101 can include its own rechargeable battery and flight controller that can be mounted within the rotor booms 105 or any suitable portion of the wing assembly 101. The battery packs in the rotor booms 105 can also be available as backup power source in the event that the electrical connection between the pod 123 and wing assembly 101 is broken or malfunctions.

With reference to FIGS. 1A-1C, the battery pack in the wing assembly 101 can also provide power for repositioning flights of the wing carrier system 101 alone, and for any startup or diagnostics needs. For example, an assembled UAV 100 with the wing assembly 101 coupled to the pod 123, can be used to deliver a pod 123 by flight to a designation delivery location. The pod 123 can then be separated from the wing assembly 101. If necessary, the batteries in the wing assembly 101 can be recharged at the designation delivery location. After the pod 123 has been separated, the wing assembly 101 can return to the original takeoff location or any other location by flying alone without a pod 123. Because the wing assembly 101 is much lighter without the pod 123, less battery power can be needed to fly the wing carrier system 101 alone without the pod 123 to a location where the wing assembly 101 is needed.

Figure 7:
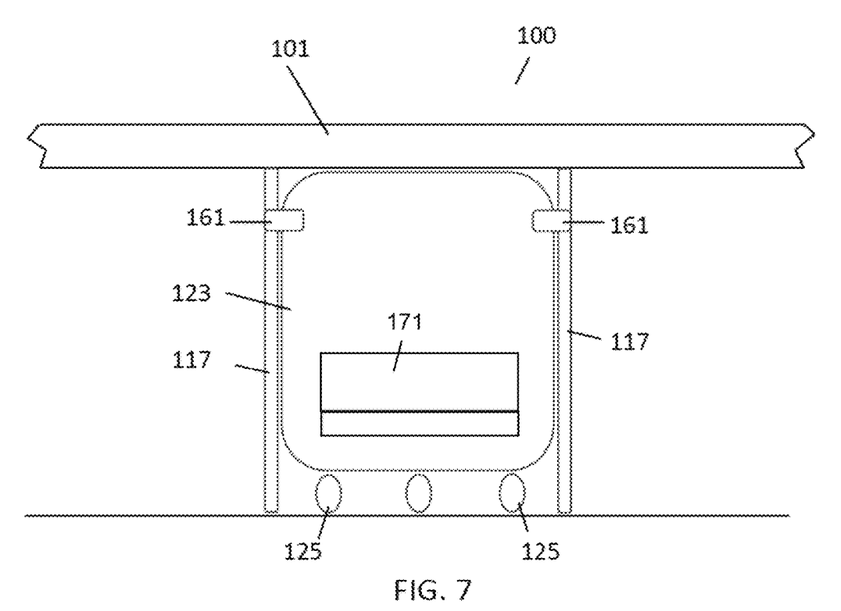
FIG. 7 illustrates a front view of the coupling mechanism for attaching the pod to the wing assembly.

With reference to FIG. 7, the wing assembly 101 can have a reciprocal connection mechanism 161 for attaching the wing assembly 101 to the pod 123. The connection mechanism 161 can mechanically and electronically connect the wing carrier system 101 to the pod 123. The reciprocal connection mechanism 161 can be a universal configuration so that any wing assembly 101 can be used with any pod 123 design. In some embodiments, there can be multiple wing assembly 101 designs and multiple pod 123 designs that all utilize the same universal connection mechanism 161 that can allow any wing carrier system 101 design to be coupled to any pod 123 design. In the coupled configuration, the wing carrier system 101 coupled to the pod 123 makes a complete UAV 100. In the illustrated embodiment, the connection mechanism 161 can have high strength protrusions that can be mechanically extended from and retracted into the pod 123. In the extended position, the connection mechanism 161 can protrude from the pod 123 and engage corresponding boles or grooves in the skids 117. The pod 123 is mechanically and electrically connected to the wing assembly 101. When the UAV 100 is on the ground, the connection mechanism 161 can be retracted into the pod 123 so that the pod 123 can be mechanically and electrically disconnected from the wing assembly 101. In the disassembled configuration, the pod 123 can be moved on the landing gear 125 away from the wing assembly 101.

In an embodiment, the landing gear 125 can be controlled to raise and lower the pod 123 relative to the wing assembly 101 by up to ±5 inches. The landing gear 125 can be adjusted so that the connection mechanism 161 aligned with the corresponding holes or grooves in the skids 117 so there is minimal sliding friction between the connection mechanism 161 and the corresponding holes or grooves in the skids 117. In the aligned position, the connection mechanism 161 is retracted into the pod 123 and the pod 123 can be moved away from the wing assembly 101. Similarly, when the pod 123 is attached to the wing assembly 101, the pod 123 can be moved under the wing assembly 101 between the skids 117. The landing gear 125 can be adjusted so that the connection mechanism 161 aligned with the corresponding holes or grooves in the skids 117 and the connection mechanism 161 extended into the corresponding holes or grooves in the skids 117 to mechanically and electrically connect the pod 123 to the wing assembly 101. In the assembled configuration, the UAV 100 can fly to the next delivery destination.

Figure 2A:
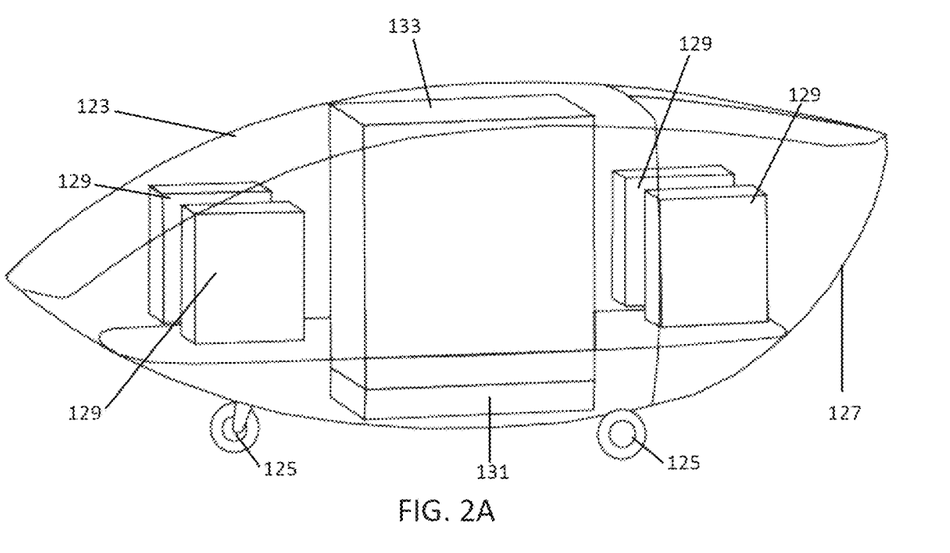
FIG. 2A illustrates a side cross section view to show the internal batteries, cargo, and pallet.
Figure 2B:
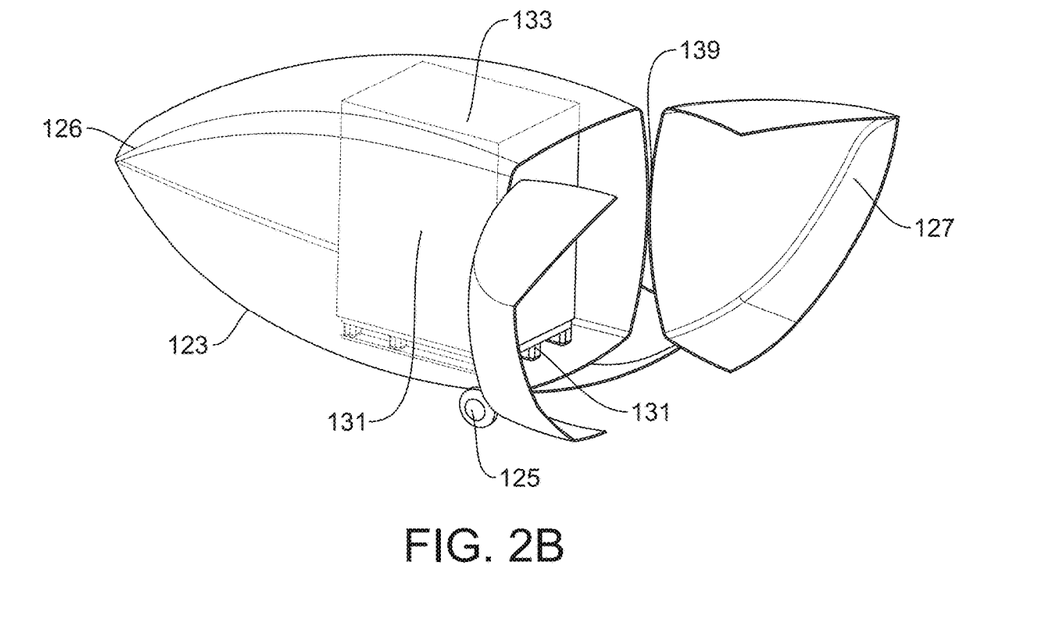
FIG. 2B illustrates a perspective view of just lines showing the outer surfaces of the rear portion of the pod with the doors open.

With reference to FIGS. 2A and 2B, an embodiment of the pod 123 of the UAV 100 is illustrated. The pod 123 can have internal space or volume for cargo 133 or passengers as well as other possible UAV 100 components including batteries. The pod 123 can be made of composite materials or other lightweight materials. The pod 123 can contain multiple modular compartments that can be used to store batteries 129, electronics, and flight equipment such as flight computers, battery charging systems, navigation systems, or other equipment.

With reference to FIG. 7, if human passengers are being transported by the UAV 100, passenger seats 171 can be mounted in the cargo volume of the pod 123. The passengers can enter the pod 123 through the pod doors and during the UAV 100 flight, the passengers can sit on the seats 171.

With reference to FIGS. 2A and 2B, the pod batteries 129 can be combined with wing batteries in the wing assembly 101 to power the motors 107 of the rotors 103 for flying the UAV 100. In some embodiments, the pod 123 may not carry any batteries 129 at all and wing batteries in the wing assembly 101 can provide the electrical power necessary for the motors 107 to fly the UAV 100 to the destination without any additional electrical power from the pod 123.

The maximum safe flying payload weight of the pod 123 (Wmax) can be a predetermined weight that must be greater than the combined weight of the pod batteries 129 (Wb) and the weight of the cargo 133 (Wc). Wmax>Wb+Wc. Thus, if the pod 123 includes a higher number of pod batteries 129, the weight of the pod batteries 129 (Wb) will increase and the permissible weight of the cargo 133 (Wc) will be reduced. Conversely, if fewer pod batteries 129 are needed, the weight of the pod batteries 129 (Wb) is reduced, and the permissible weight of the cargo 133 (Wc) can be increased while still being under the (Wmax) value. The quantity of pod batteries 129 needed is variable depending upon the flight range of the cargo 133 delivery. More batteries 129 may be required for longer flights. However, this can result in a higher (Wb) which can lower the maximum allowable cargo 133 weight (Wc). Conversely, fewer batteries 129 may be sufficient for shorter flights which results in a lower (Wb), allowing the maximum allowable cargo 133 weight (Wc) to be higher.

In a cargo configuration, the pod 123 can be loaded with cargo 133 that is on a pallet 131 using a forklift 145 and/or a pallet jack, or similar pallet loading device. The cargo 133 loading or unloading can occur both when the pod 123 is separated from the wing carrier 101 and/or when the pod 123 is connected to the wing carrier 101. The pod 123 can have landing gear 125 with wheels that allow the pod 123 to be rolled, either by being pushed and/or pulled by an aircraft tug. The pod 123 has a connecting mechanism 161 that connects the pod 123 both mechanically and electrically to the wing carrier 101.

The removable pod 123 can be a modified teardrop shape with a rounded frontal portion and a tapered rear portion. In the illustrated embodiment, the front of the pod 123 can have a rounded shape where the top front surface of the pod 123 can curve downward from the top wing connection portion and the front bottom surface can curve upward from the front landing gear 125 portion. The rear portion of the pod 123 can have side surfaces that taper inward towards a center line from the sides of the pod 123. The rear bottom portion of the pod 123 can curve upward from the front landing gear 125 portion.

The floor of the internal cargo storage volume in the pod 123 can be a horizontal planar surface that can be at least 40 inches in width by at least 48 inches in length by at least 72 inches in height. Rear door(s) 127 at the rear portion of the pod can open with an edge of the door opening adjacent to the storage volume. The rear door(s) 127 can be attached to hinges coupled to the left and right side of the pod 123 that allow the rear door(s) 127 to open about a vertical axis so that the door(s) 127 swing horizontally outward. As illustrated in FIG. 4C, the rear doors 127 can rotate under the tail booms 109 and under the wing 101. The wing and tail booms 109 can be lower than the height of the elevator In an alternative embodiment, the rear door(s) 127 can be attached to a hinge that rotates about a horizontal axis and the rear door can rotating upward behind the wing 101 and between the tail booms 109. In this embodiment, the lowest portion of the door 127 in the raised position is greater than 72 inches so that the forklift can move under the door 127 to place cargo into the pod 123.

In some embodiments, the pod 123 can have a door 126 at the front of the pod 123 and/or a door 127 at the rear of the pod 123. The front door 126 and/or the rear door 127 can be opened to load either cargo 133 or passengers. In the rear door 127 loading configuration, the doors 127 can open in a double door configuration. In the front load configuration, the front door 126 can either be a double door or single door.

In the cargo configuration of the pod 123, a pallet 131, such as a 40 inch×48 inch pallet and/or EUR-pallet that can be about 1 meter×1.2 meters, can be loaded into the internal cargo space of the pod 123. In the passenger configuration, 1 or more persons can sit in the internal volume passenger compartment of the pod 123. The pod 123 can be extended horizontally to add additional internal volume for increasing cargo 133 or passenger carrying capacity. The floor of the internal volume of the cargo storage portion of the pod 123 can be horizontal or planar. In some embodiments, the pod 123 can have a maximum height of 76" and can safely load cargo 133 on a pallet 131 that is up to 72" in height.

The pod 123 can also contain modular battery systems 129 in battery portions of the pod 123 that can be removed, upgraded, exchanged, and/or added without impacting the functionality of the pod 123. The batteries 129 can be charged by existing electrical charging infrastructure, such as level 2 alternating current (AC) charging infrastructure via an SAE J1772 receptacle, and an onboard AC to direct current (DC) converter and battery chargers. In some embodiments, the batteries 129 can also be charged by level 3 DC charging infrastructure by an SAE Combo combined charging system (CCS) receptacle on an external surface of the pod 123. In some embodiments, the modular battery systems 129 can be distributed with some batteries 129 at the front portion of the pod 123 and some modular batteries 129 at the rear portion of the pod 123 so that the center of balance of the pod 123 is centrally located.

The pod 123 can rest on a landing gear 125 that can include wheels 125 that allow the pod 123 to be rolled by being pushed and/or pulled away from the wing assembly 101. For example, the front wheel can be connected to a standard aircraft tug that can be used to move the pod 123 away from the wing assembly 101 to a cargo loading and unloading area. For example, a delivered pod 123 having depleted batteries 129 can be moved to an unloading area where the cargo 133 is unloaded and delivered to cargo recipients. The delivered pod 123 can then be coupled to a battery charging station to recharge the batteries 129 in the pod 123. The depleted delivered pod 123 can be replaced with a replacement pod 123 having cargo that is to be delivered to a different location that includes fully charged batteries 129. The replacement pod 123 can be pushed and/or pulled with the standard aircraft tug from the cargo loading area to the wing assembly 101. The replacement pod 123 can be coupled to the wing assembly 101 and the assembled UAV 100 can fly to the next cargo delivery destination.

The center of balance of the pod 123 is centrally located between the rear wheel(s) and the front wheel(s) of the landing gear 125. The center of balance of the wing assembly 101 is centrally located between the skids 117 such that the weight of the wing assembly can be supported by the skids 117. When the pod 123 is connected to a wing assembly 101 system, the coupled combination completes the UAV 100. A coupling mechanism can be used to connect the pod 123 mechanically and electrically to the wing assembly 101. In some embodiments, there can be separate mechanical and electrical coupling mechanisms to connect the wing assembly 101 to the pod 123. In the assembled state, the weight of the entire UAV 100 can be completely supported by the landing gear 125. The center of balance of the pod 123 coupled to the wing assembly 101 can be centrally located between the rear wheel(s) and the front wheel(s) of the landing gear 125.

Figure 6:
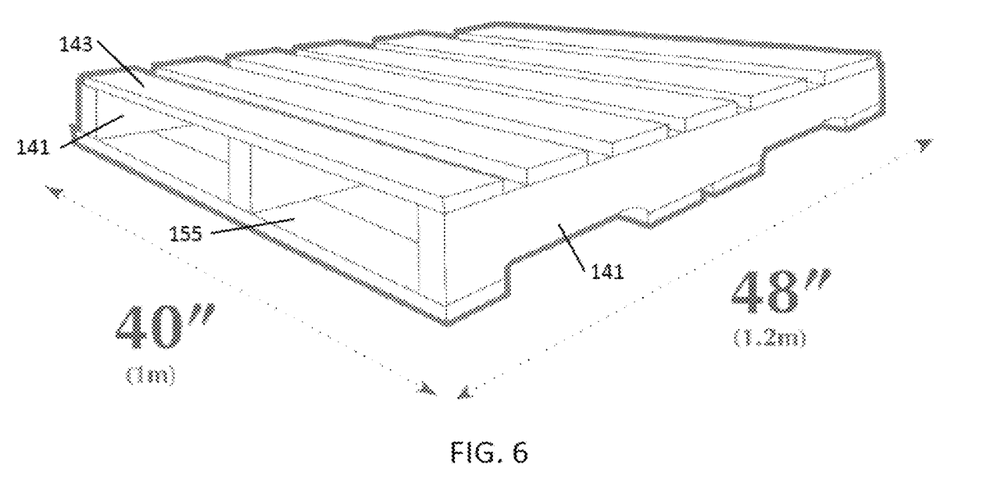
FIG. 6 illustrates a top perspective view of a standard sized pallet.

The process for shipping of cargo 133 using the present invention can typically consist of cargo 133 being placed onto a pallet 131. The cargo 133 can be secured to the pallet 131 with plastic wrap, rope, or other fasteners, adhesives, or straps. With reference to FIG. 6, the pallet 131 can be constructed of at least one top deckboard 143 in direct contact with the cargo and for bearing the weight or load of the cargo. The pallet 131 can also include at least one lower deckboard 145 which contacts the ground before the pallet 131 is moved to the UAV. At least one stringer 141 that can be perpendicular to the upper deckboard 143 can provide a center spacing through the center of the pallet 131. The fork of a forklift 145, pallet truck 153, or similar pallet loading device can be placed through the center space in the pallet 131. The forklift 145, pallet truck 153, or similar pallet loading device, is then able to insert its fork(s) into the gap created by the stringer 141 and then lifted to bear the load of the cargo 133 that is resting on the upper deckboard 143.

In an embodiment, the UAV can have the following specifications:

|  | Illustrated Embodiments | Possible Range |
| --- | --- | --- |
| Wing Span | 49 feet | 30-60 feet |
|  | 15 meters | 10-20 meters |
| Length | 26 feet | 20-32 feet |
|  | 8 meters | 6.4-9.6 meters |
| Height | 9 feet | 7.2-10.8 feet |
|  | 2.8 meters | 2.24-3.36 meters |
| Max. Drone Take Off Mass | 6,052 lbs. 2,745 kgs. |  |
| Drone Without Battery Mass | 3,168 lbs. 1,437 kgs. |  |
| Battery Mass | 2,388 lbs. 1,083 kgs. | 1,910-2,884 lbs. 866-1,308 kgs. |
| Design Payload Mass | 496 lbs 0-225 kgs | 0-974 lbs. 0-442 kgs. |

|  | Illustrated Embodiments | Possible Range |
| --- | --- | --- |
| Design Range | 100+ miles<br>160+ kilometers |  |
| Cruise Speed | 150 mph<br>244 kilometers/hour |  |

In some embodiments, the maximum UAV mass at takeoff can be 6,052 lbs. with a combination of batteries 2,388 lbs. and a payload of up to 496 lbs. At the maximum takeoff weight, the UAV can fly at a cruising speed of 150 mph for a distance of 100 miles. If there is less payload weight, additional batteries can be added to the UAV which can result in a longer travel range of more than 100 miles. Conversely, if the UAV is carrying additional payload, then the batteries can be reduced to keep the total weight at or less than 6,052 lbs. and the range can be reduced to distances much lower than 100 miles.

Figure 4A:
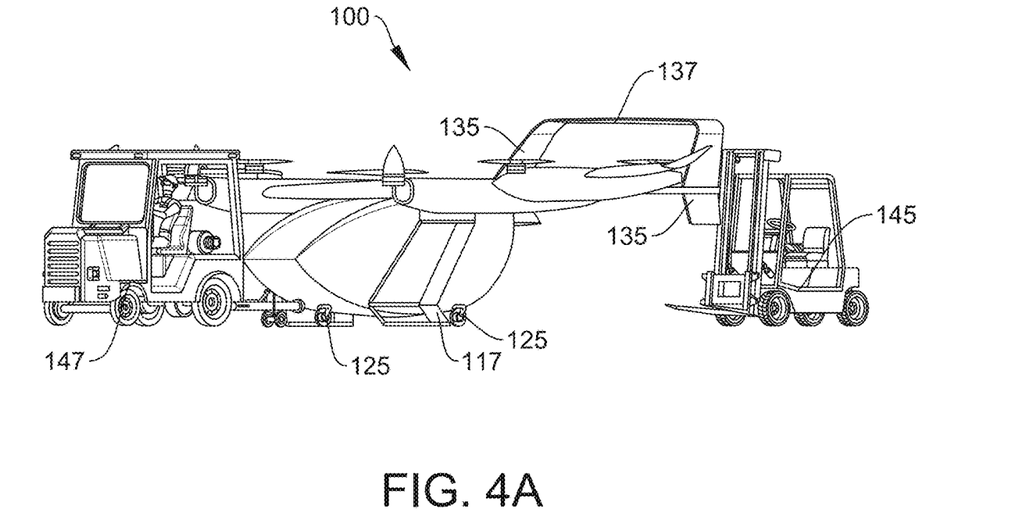
FIG. 4A illustrates a front perspective view of the drone on a flat ground surface with a fork lift and a pod pull cart.
Figure 4B:
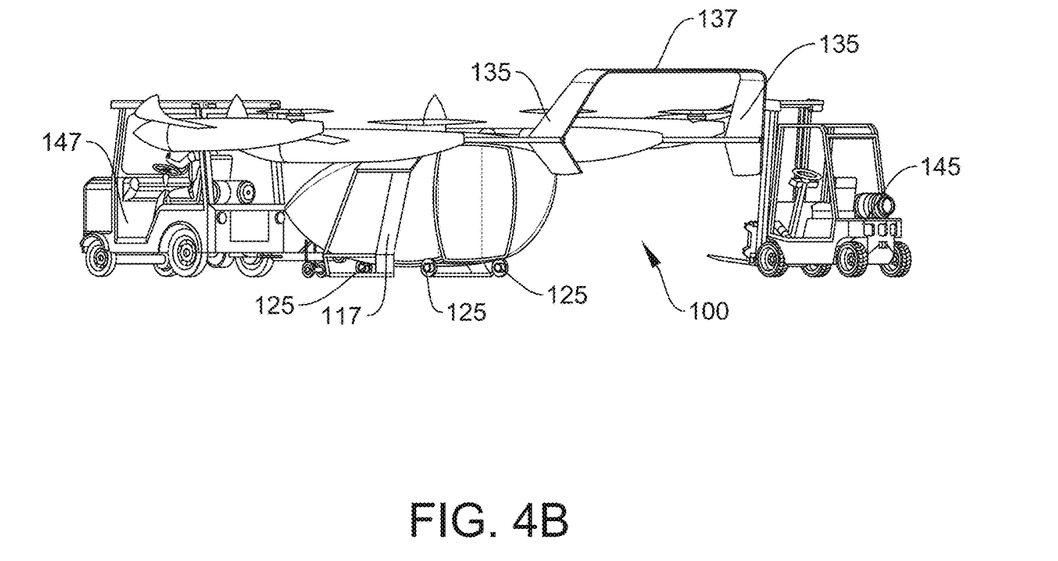
FIG. 4B illustrates a rear perspective view of the drone on a flat ground surface with the rear doors open with a fork lift and a pod pull cart.
Figure 4C:
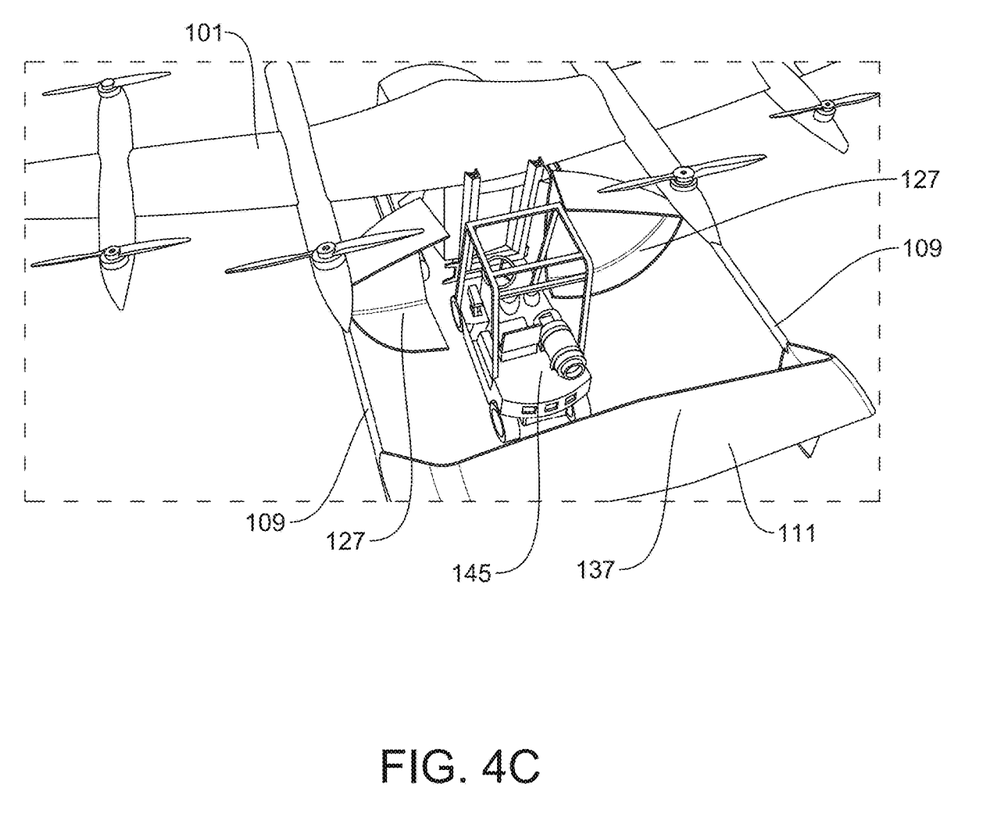
FIG. 4C illustrates a top perspective view of a fork lift placing cargo on a pallet into a pod.

With reference to FIGS. 4A-4C, after the cargo 133 and pallet 131 have been lifted by the fork(s) of the forklift 145, the forklift can approach the door 127 on a rear end of the pod 123 of the UAV 100. The highest point of the forklift 145, or similar pallet loading device can fit between the tail booms 109 with clearance between the vertical stabilizers 135 and under horizontal stabilizer 137. The tail booms 109 can be horizontal and the same height as the wings 101. A front portion of the tail booms 109 can be coupled to the wings 101 and the rear portion of the tail booms 109 can be coupled to a lower portion of the vertical stabilizers 135. The left and right ends of the horizontal stabilizer 137 can be coupled to the tops or the upper portions of the vertical stabilizers 135.

A forklift 145 such as a Toyota 8FGU25 Forklift can have a height of 84 inches and a width of 46 inches. The forklift 145 can move between the tail booms 109 and the vertical stabilizers 135 to access the rear portion of the pod 123. Thus, the heights of the wings 101, the tail booms 109 and the lower portions of the vertical stabilizers 135 can be lower than the 84 inch height of the forklift 145. However, in order to provide sufficient clearance, the tops of the vertical stabilizers 135 and the horizontal stabilizer 137 should be higher than 84 inches in height from the ground and can be as high as 100 inches. The horizontal distance between the tail booms 109 and the lower portions of the vertical stabilizers 135 should be more than 48 inches and can be up to 100 inches apart. The height of the horizontal stabilizer 137 can be at least 12, 18, or 24 inches higher than the height of the wings 101 and the tail booms 109.

As the forklift 145 gets close to the door 127 of the pod 123, the cargo 133 and pallet 131 can be elevated to the loading elevation by means of the mast of the forklift 145 such that the bottom deckboard 155 of the pallet 131 is above the interior floor surface of the pod 123 that can be parallel to the ground and the top of the cargo 133 is below the lower top edge of the door 127 and interior uppermost of the pod 123. The interior floor surface of the pod 123 is designed to bear the weight of the cargo 133 and pallet 131. The forklift 145 can fully insert the cargo 133 and pallet 131 into the pod 123. The forklift 145 can then lower the cargo 133 and pallet 131 until the lower deckboard 155 of the pallet 131 contacts the top face of the interior floor surface of the pod 123 until the weight of the cargo 133, and the pallet 131 is fully supported by the interior floor surface of the pod 123. After the weight of the cargo 133 being transferred into the pod 123, the forklift 145 can then move backwards away from the pod 123 and the UAV 100 between the vertical stabilizer 135 and under horizontal stabilizer 137. Once the forklift 145 is clear of the UAV 100, the rear door(s) 127 can be closed. Upon the door(s) 127 being closed, the pod 123 forms an aerodynamic shape, that can be a tear drop, to reduce drag forces when in flight. The UAV 100 can then fly to the destination.

In some embodiments, a pod pull cart 147 can have a tow bar that can be coupled to the front wheel of the landing gear 125 and used to pull the assembled UAV 100 or just the pod 123. The pod pull cart 147 can be used to move a pod 123 from a cargo loading area to a wing assembly 101 where the pod 123 can be coupled to the wing assembly 101 before flight. The pod pull cart 147 can be used to move the pod 123 away from the wing assembly 101 after the pod 123 can be decoupled from the wing assembly 101 after flight to a cargo unloading area. The pod pull cart 147 can be used to move the pod 123 from a cargo loading area to the wing assembly 101 before the pod 123 is coupled to the wing assembly 101 before a flight. The pod pull cart 147 can also be used to move assembled UAV 100 to any desired location such as into a UAV hangar to protect the UAV 100 from the environment or to a launch area before takeoff.

Figure 5A:
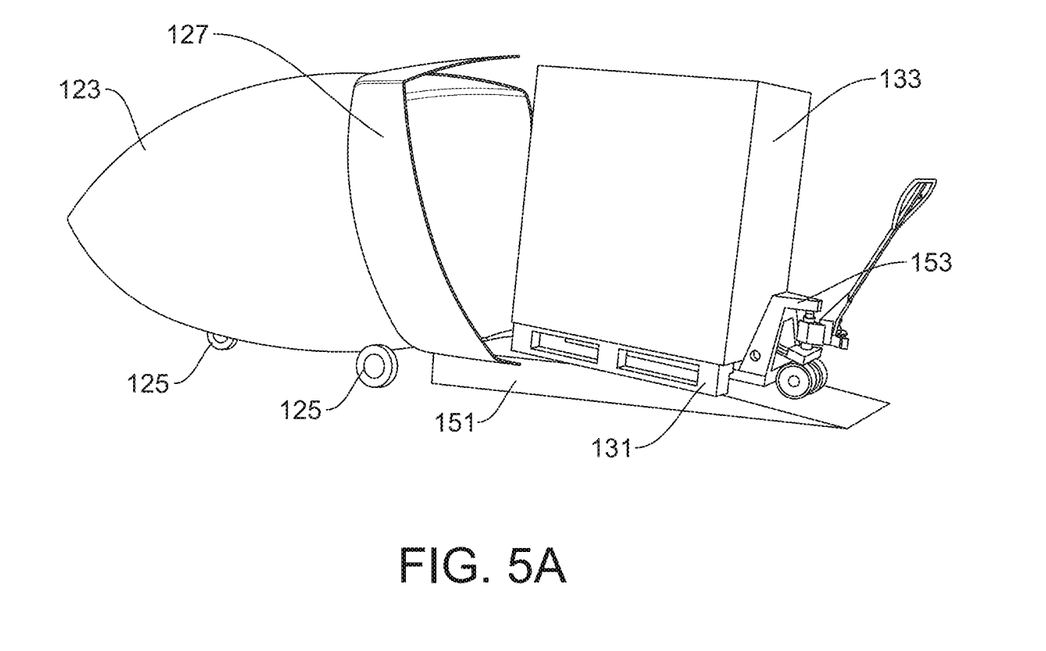
FIG. 5A illustrates a side view of the drone on a flat ground surface with a ramp used to move a fork truck into the pod.
Figure 5B:
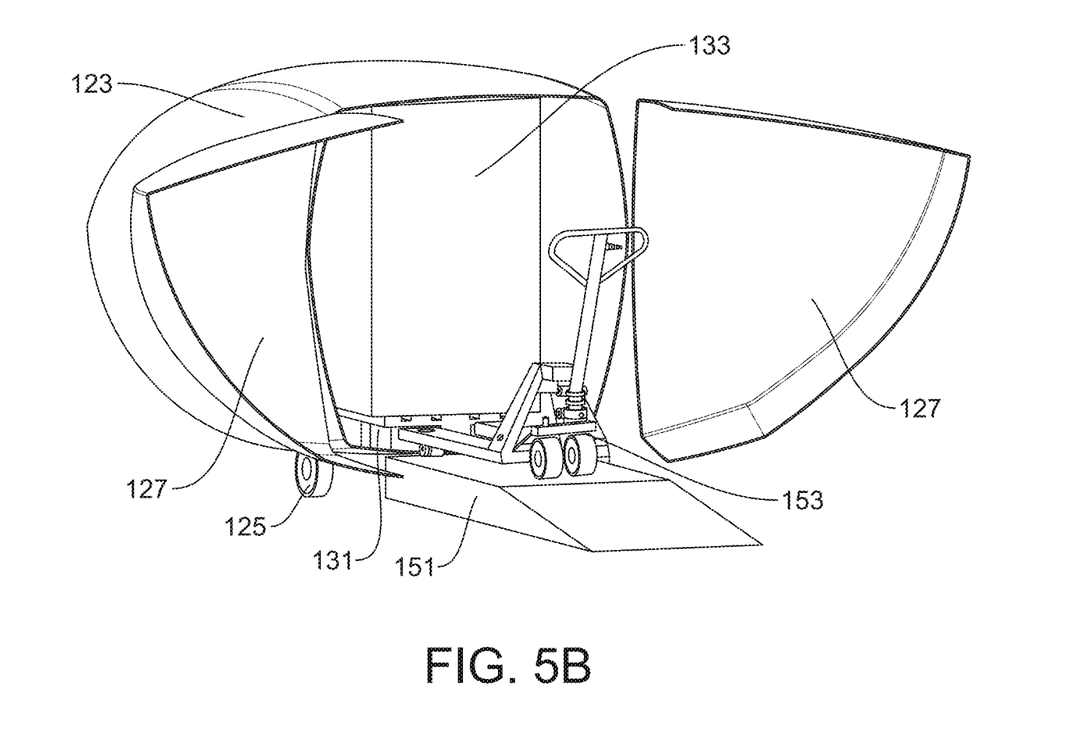
FIG. 5B illustrates a rear perspective view of the drone on a flat ground surface with a ramp in placed used to remove a fork truck from the pod.

With reference to FIGS. 5A and 5B, the pod 123 is separated from the wing assembly 101 and the rear doors 127 are opened. A ramp 151 has been placed behind the pod 123 adjacent to the rear door 127 opening. Cargo 133 has been placed on a pallet 131 and a pallet truck 153 has been used to load the cargo 133 into the pod 123. With reference to FIG. 5A, the pallet truck with the cargo 133 and pallet 131 are rolled up the ramp 151. With reference to FIG. 5B, the pallet 131 and cargo 133 have been lowered onto the interior floor surface of the pod 123. The pallet truck 153 is then rolled back away from the pallet 131, down the ramp 151 and away from the pod 123. Once the pallet truck 153 is clear of the ramp, pod 123 can be coupled to the wing assembly 101 and the assembled UAV 100 with the cargo 133 can fly to the destination as shown in FIGS. 1B and 1C.

In an alternative embodiment as shown in FIG. 2B, the pod 123 can have a front door 126 that may be in the front of the pod 123 such that the clearance provided under the tail 115 is not needed. In another embodiment, the wing 101 and rotor boom 105 may provide clearance with the door 127 to deliver the cargo 133 on the pallet 131 from the side where the skid 117 is located. In these embodiments, the cargo 133 and the pallet 131 are able to be loaded by the forklift 145, or other pallet loading device, into the pod 123 without having the pod 123 being separated from the wing 101.

The present invention and some of its advantages have been described in detail for some embodiments. It should be understood that although the process is described with reference to a device, system, and method the process may be used in other contexts as well. It should also be understood that various changes, substitutions, and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods, and steps described in the specification. A person having ordinary skill in the art will readily appreciate from the disclosure of the present invention that processes, machines, manufacturing steps, compositions of matter, means, methods, or steps, presently existing or later to be developed are equivalent to, and fall within the scope of, what is claimed. Accordingly, the appended claims are intended to include within their scope such processes, machines, manufacturing steps, compositions of matter, means, methods, or steps.

What is claimed is:

1. A wing assembly for an unmanned aerial vehicle (UAV), comprising:
a pair of wings extending outwardly from a pod connection mechanism;
a pod housing having an upper portion that is releasably coupled to the pod connection mechanism;
two or more rotor booms that are coupled across cord portions of the pair of wings;
electric motors, wherein each of the electric motors is coupled to a front portion or a rear portion of the two or more rotor booms;
tail booms extending horizontally backwards from rear portions of the pair of wings;
a tail portion coupled to rear portions of the tail booms, the tail portion having two rudders and an elevator assembly coupled to top portions of the two rudders;
two skids for supporting the wing assembly when the two skids are in contact with a ground surface, the two skids are permanently coupled to and extend downward from lower portions of the pair of wings; and
landing gear mounted to a lower portion of the pod housing, the landing gear having a plurality of wheels for rolling the pod module on the ground, wherein landing gear is adjustable in height to raise and lower the pod housing relative to the pair of wings.

2. The wing assembly of claim 1 further comprising:
a flight control computer; and
a radio frequency transceiver.

3. The wing assembly of claim 1 further comprising:
batteries mounted in the two or more rotor booms for powering the electric motors.

4. The wing assembly of claim 1 wherein the top portions of the two rudders are angled inward from the bottom portions of the two rudders.

5. The wing assembly of claim 1 wherein the two skids each include elongated horizontal structures that are in contact with the ground and a center of gravity of the wing assembly is between front ends and rear ends of the two skids.

6. The wing assembly of claim 1 further comprising:
an internal cargo storage volume in the pod housing having a length that is greater than 48 inches, a width that is greater than 40 inches, and a height that is greater than 84 inches;
a plurality of battery modules containing rechargeable batteries placed in battery portions of the pod housing wherein the battery portions are in front of and behind the internal cargo storage volume;
a battery charging port on an external surface of the pod housing, the battery charging port is electrically coupled to the plurality of battery modules;
landing gear mounted to a lower portion of the pod, the landing gear having a plurality of wheels for rolling the pod module on the ground; and
an electrical connection mechanism that electrically connects the plurality of battery modules to electrical components in the pair of wings.

7. The wing assembly of claim 6 further comprising:
a first door that is opened to load cargo into the internal cargo storage volume, wherein the first door is coupled to a rear door opening of the pod housing with a first hinge and the door opening is at least 40 inches wide and at least 72 inches high.

8. The wing assembly of claim 6 further comprising:
a passenger seat in the internal cargo storage volume.

9. The wing assembly of claim 6 wherein the connection mechanism allows the pod module to be removed and separated from the wing assembly.

10. The wing assembly of claim 6 wherein the connection mechanism mechanically links both the pod module and the wing assembly and the connection mechanism transfers electric energy from the pod module to the wing assembly.

11. The wing assembly of claim 6 wherein the pod module has an aerodynamic outer surface that has a rounded front surface and a tapered rear portion.

12. The wing assembly of claim 6 further comprising:
additional battery modules in the pod for providing electric energy to motors that drive rotors to allow the UAV to fly longer distances.

13. The wing assembly of claim 6 wherein the pod module is made from: composite, plastic, or other lightweight structural materials.

14. The wing assembly of claim 1 wherein the two skids are not adjustable in height.

* * * * *